Dec. 16, 1941.   V. M. PALMER   2,266,439
MOTION PICTURE FILM CONTAINER
Filed Jan. 26, 1939
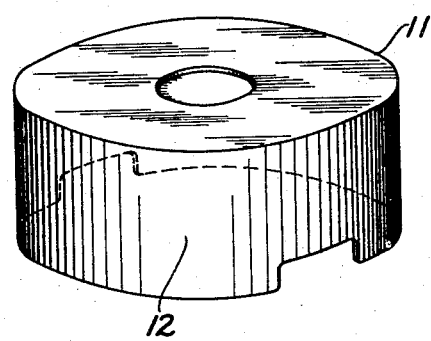
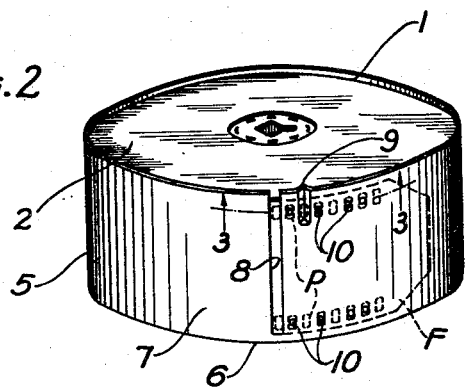
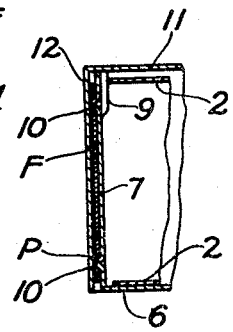
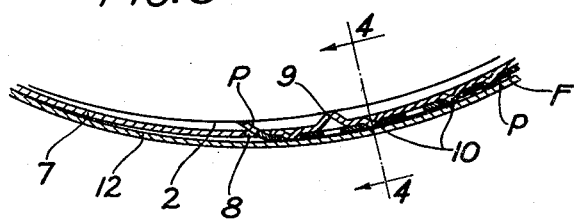
VIRGIL M. PALMER
INVENTOR
BY
ATTORNEYS Patented Dec. 16, 1941

2,266,439

UNITED STATES PATENT OFFICE 2,266,439

MOTION PICTURE FILM CONTAINER

Virgil M. Palmer, Rochester, N. Y., assignor to Eastman Kodak Company, Rochester, N. Y., a corporation of New Jersey Application January 26, 1939, Serial No. 252,998

4 Claims. (Cl. 206—53)

This invention relates to a container for motion picture film and particularly to a container in which the film is held against movement which may occur due to shipping.

One object of my invention is to provide a container for motion picture film wound on a reel with means to prevent rotation of the reel relative to the container, and means to prevent movement of the film relative to the reel. Another object of my invention is to provide a container for motion picture film consisting of two "pill box" like parts having telescoping side walls, one of which is provided with a means for holding a film reel against movement, and the other with a means for telescoping the flange to clamp the film spool. Still another object is to provide a film engaging portion of the container by which the film end is definitely clamped in a fixed position. Other objects will appear from the following specification, the novel features being particularly pointed out in the claims at the end thereof.

In shipping motion picture film reels, there have been two difficulties, both of which are liable to damage the film. First, if the reel is permitted to turn in its container, the convolutions of film may come loose so that when the container is removed, the film will spring out beyond the flanges of the reel and thus become light struck. Second, if the film reel does not move and the end of the film moves, the same thing is liable to occur since the reel may remain stationary and the end of the film may move so as to loosen or tighten the film convolutions on the reel. This may produce friction marks or it may cause the film to loosen to such an extent that fogging will occur as above noted.

In the film container which I will now describe, I have provided a means for frictionally clamping the film spool in the container and for fixedly holding the film end in a definite position by merely providing a few simple formings on one flange of one of the container members. Thus, the film reel is held against movement and the film end is held against movement and all of the difficulties above described can be readily overcome.

Coming now to the drawing wherein like reference characters denote like parts throughout:

Fig. 1 is a perspective view of a cover section of a film container constructed in accordance with and embodying a preferred form of my invention.

Fig 2 is a perspective view of the second section of my film container showing the slot through which the film may pass together with the protuberances which engage the film spool and engage the film.

Fig. 3 is an enlarged sectional view on line 3—3 of Fig. 2.

Fig. 4 is an enlarged sectional view on line 4—4 of Fig. 3, but with both sections of the container shown in an operative position.

As indicated in Fig. 2, motion picture film F having the usual perforations P may be wound upon a film spool 1 which may consist of a known type of hub fastened to flanges 2, the film F fitting snugly between the flanges and being wound on a core.

The pill box type of film container may consist of a bottom section designated broadly as 5 having a circular bottom wall 6 and an upstanding flange 7, this flange being slotted at 8 so that the film strip F may be drawn outside of the wall 7.

Adjacent the slot 8 and slightly to one side, I prefer to provide an inwardly formed protuberance or rib 9 which extends down from the top of the flange 7 a distance sufficient to definitely engage the upper flange 2 of the film reel 1. I also provide a plurality of outwardly formed protuberances 10, these being spaced in accordance with the spacing of the aperture P in the film. It is not particularly material how many of these protuberances are provided, although in the present embodiment of my invention I have provided eight, four at the top and four at the bottom. With the container above described, the film reel 1 is dropped in place and is turned until the perforations of the film end F may be engaged with the protuberances 10. A cover member 11 having a downwardly extending flange 12 is then slid into place and this cover member, by telescoping the upstanding flange 7, pinches the protuberance 9 firmly against the film reel and likewise holds the film on the protuberances 10, as indicated in Fig. 3. Thus, the cover accomplishes two functions—that of forming a light-tight cover for the slot 8 and that of pressing inwardly upon the rib or protuberance 9 for holding the film spool 1 in a fixed position in the container. Since the film is also definitely held in position by means of the flange 12 of the cover member 11 after the package is assembled, neither the film spool nor the film itself can move, and consequently there is no danger of having the film "clock spring" in such a manner that in removing the film from the container after loading the camera, a portion of the film may become fogged.

I might point out that this container is used in the same manner as the container shown in Patent 1,510,738, Capstaff, granted October 7, 1924, in that in loading the film, the cover is taken off and the film is positioned in the camera while still in the bottom container. This is a big advantage, as it reduces the possibility of light entering and fogging an unnecessary amount of film. It is, of course, always necessary to fog a portion of the end which may be drawn out from the slot 8 which is used for threading the camera, but this can be done and the container 6 removed only after the camera has been properly threaded so that the film is protected up to the time that the camera door is closed.

What I claim is:

1. A substantially light tight two part pill box container adapted to protect a reel of perforated motion picture film, comprising a pair of sections each consisting of a circular wall having an annular upstanding flange thereon, one flange adapted to telescope the other flange, the inner section including a slot extruding transversely of the flange, a plurality of protuberances located on said flange adjacent the slot and extending outwardly a distance greater than the thickness of the film, the protuberances being located on the flange in spaced relationship parallel to the circular wall and spaced therefrom a distance to engage perforations in a film in the container, the outer pill box section upstanding flange being a relatively solid and continuous flange for compressing the inner slotted flange and holding an end of the film passing through said slot and with the perforations engaging the protuberances thereon, said end of the film lying at least partially between portions of the upstanding annular flanges.

2. A substantially light tight two part pill box container adapted to protect a reel of perforated motion picture film, comprising a pair of sections each consisting of a circular wall having an annular upstanding flange thereon, one flange adapted to telescope the other flange, the inner section including a slot extruding transversely of the flange, a plurality of protuberances located on said flange adjacent the slot and extending outwardly a distance greater than the thickness of the film, the protuberances being located on the flange in spaced relationship parallel to the circular wall and spaced therefrom a distance to engage perforations in a film in the container, the outer pill box section upstanding flange being a relatively solid and continuous flange for compressing the inner slotted flange and holding an end of the film passing through said slot and with the perforations engaging the protuberances thereon, said end of the film lying at least partially between portions of the upstanding annular flanges, a second elongated protuberance carried by the inner flange adjacent the edge thereof near the transverse slot and projecting inwardly toward the center of the pill box and positioned to engage a flange of the film reel to frictionally hold the reel against movement when the outer telescoping pill box section forces edges of the slotted inner pill box section flange toward the reel.

3. A substantially light tight two part pill box container adapted to protect a reel of perforated motion picture film, comprising a pair of sections each consisting of a circular wall having an annular upstanding flange thereon, one flange adapted to telescope the other flange, the inner section including a slot extending transversely of the flange, a plurality of protuberances located on said flange adjacent the slot and extending outwardly a distance greater than the thickness of the film, the protuberances being located on the flange in spaced relationship parallel to the circular wall and spaced therefrom a distance to engage perforations in a film in the container, one group of said protuberances being positioned on a line spaced from the upper edge of said flange and another group of said protuberances being positioned on a line spaced from the lower edge of said flange so as to engage both sets of perforations in said motion picture film, the outer pill box section upstanding flange being a relatively solid and continuous flange for compressing the inner slotted flange, and holding an end of the film passing through said slot and with the perforations engaging the protuberances thereon, said end of the film lying at least partially between portions of the upstanding annular flanges.

4. A substantially light tight two part pill box container adapted to protect a reel of perforated motion picture film, comprising a pair of sections each consisting of a circular wall having an annular upstanding flange thereon, one flange adapted to telescope the other flange, the inner section including a slot extending transversely of the flange, the inner diameter of the annular upstanding flange being slightly greater than the diameter of the reel on which the perforated film is wound, a plurality of protuberances located on said flange adjacent the slot and extending outwardly a distance greater than the thickness of the film, the protuberances being located on the flange in spaced relationship parallel to the circular wall and spaced therefrom a distance to engage perforations in a film in the container, the outer pill box section upstanding flange being a relatively solid and continuous flange for compressing the inner slotted flange, and holding an end of the film passing through said slot and with the perforations engaging the protuberances thereon, said end of the film lying at least partially between portions of the upstanding annular flanges, a second elongated protuberance carried by the inner flange adjacent the edge thereof near the transverse slot and projecting inwardly toward the center of the pill box and positioned to engage a flange of the film reel to frictionally hold the reel against movement when the outer telescoping pill box section forces edges of the slotted inner pill box section flange toward the reel, said slotted flange flexing to freely admit the reel flange when the outer pill box section has been removed from its telescoping relationship with the inner pill box section.

VIRGIL M. PALMER.